United States Patent
Li et al.

(10) Patent No.: US 12,046,785 B2
(45) Date of Patent: Jul. 23, 2024

(54) SYSTEMS INCLUDING ION EXCHANGE MEMBRANES AND METHODS OF MAKING THE SAME

(71) Applicant: BETTERGY CORP., Peekskill, NY (US)

(72) Inventors: Lin-Feng Li, Croton On Hudson, NY (US); Shixuan Zeng, Croton On Hudson, NY (US); Caihong Liu, New City, NY (US); Hye Young Jung, Chappaqua, NY (US)

(73) Assignee: Bettergy Corp., Peekskill, NY (US)

( * ) Notice: Subject to any disclaimer, the term of this patent is extended or adjusted under 35 U.S.C. 154(b) by 97 days.

(21) Appl. No.: 17/567,468

(22) Filed: Jan. 3, 2022

(65) Prior Publication Data

US 2022/0384833 A1    Dec. 1, 2022

Related U.S. Application Data

(60) Provisional application No. 63/133,545, filed on Jan. 4, 2021.

(51) Int. Cl.
| | |
|---|---|
| *H01M 8/1041* | (2016.01) |
| *B01J 39/14* | (2006.01) |
| *C25B 9/19* | (2021.01) |
| *C25B 13/02* | (2006.01) |
| *C25B 13/05* | (2021.01) |
| *C25B 13/08* | (2006.01) |
| *H01M 4/88* | (2006.01) |

(Continued)

(52) U.S. Cl.
CPC ........... *H01M 8/1055* (2013.01); *B01J 39/14* (2013.01); *C25B 9/19* (2021.01); *C25B 13/02* (2013.01); *C25B 13/05* (2021.01); *C25B 13/08* (2013.01); *H01M 4/881* (2013.01); *H01M 8/1053* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 6,130,175 | A | 10/2000 | Rusch et al. |
| 7,108,935 | B2 | 9/2006 | Bauer et al. |
| 9,370,773 | B2 | 6/2016 | Masel et al. |

(Continued)

FOREIGN PATENT DOCUMENTS

CN            103515630         * 10/2014

OTHER PUBLICATIONS

Sial, et al, Multimetallic nanosheets: synthesis and applications in fuel cells, Chem. Soc. Rev., 2018, 47, 6175 (Year: 2018).*

Primary Examiner — Ula C Ruddock
Assistant Examiner — Mary Grace Byram
(74) Attorney, Agent, or Firm — Morris Law Group; Robert W. Morris

(57) ABSTRACT

Systems, methods, and membranes involving ion exchange membranes are disclosed. In an embodiment of the present invention, an ultrathin laminar layer made of inorganic nanosheets may be coated on one side or both sides of a polymeric anion exchange membrane (AEM), forming a composite AEM. Oxidation stability measurements may indicate that composite AEM provide superior oxidation resistance to exemplary polymeric AEMs and to commercial polymeric AEMs.

23 Claims, 15 Drawing Sheets

(51) Int. Cl.
*H01M 8/1053* (2016.01)
*H01M 8/10* (2016.01)

(56) References Cited

U.S. PATENT DOCUMENTS

| | | | |
|---|---|---|---|
| 2004/0126641 A1* | 7/2004 | Pearson | H01M 8/249 |
| | | | 429/418 |
| 2014/0107237 A1 | 4/2014 | Yan et al. | |
| 2018/0034043 A1* | 2/2018 | DeLangis | G21H 1/02 |
| 2020/0070142 A1 | 3/2020 | Bahar et al. | |
| 2020/0406248 A1 | 12/2020 | Bahar et al. | |

* cited by examiner

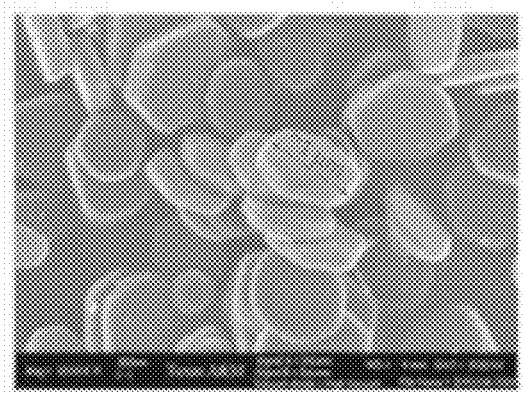 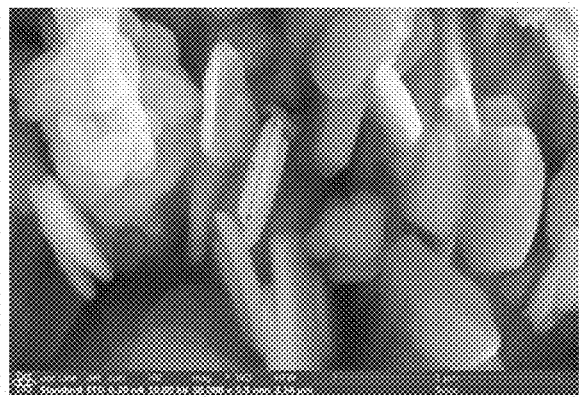
FIG. 6A  FIG. 6B
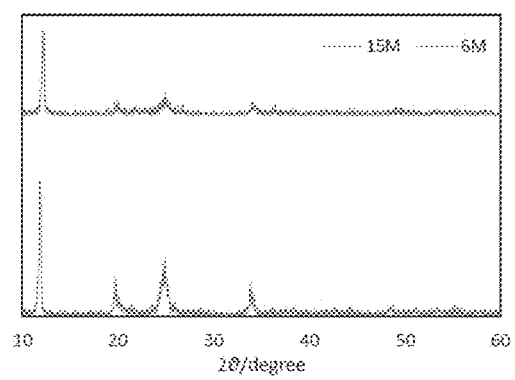
FIG. 6C

SYSTEMS INCLUDING ION EXCHANGE MEMBRANES AND METHODS OF MAKING THE SAME

CROSS-REFERENCE TO RELATED APPLICATION

This application claims the benefit of U.S. Provisional Application No. 63/133,545, filed on Jan. 4, 2021, the disclosure of which is incorporated herein by reference in its entirety for all purposes.

GOVERNMENT FUNDING

The invention was made with the U.S. government support under N00014-12-C-0565 and DE-SC0020599. The Federal government may have certain rights in the invention.

FIELD OF THE INVENTION

The present invention relates to the field of fuel cells, electrolyzers, solar hydrogen generation devices, redox flow batteries, and other electrochemical synthesis apparatus, as well as dialysis, reverse osmosis, forward osmosis, pervaporation, ion exchange and sensor apparatus, which specifically contain anion exchange membranes (AEMs). The invention provides a composite ion exchange membrane structure that can effectively improve the oxidation resistance and durability of polymeric AEMs known in the art.

BACKGROUND OF THE INVENTION

Since the introduction of perfluorosulfonic acid polymer membranes, such as Nafion, by Du Pont, Proton exchange membrane (PEM) based low temperature fuel cells (PEMFCs) have received widespread attention for their potential in commercial (EVs, off-road vehicles and backup power, etc.) and military applications that require power ranging from kilowatts to megawatts. However, the acid nature of the proton exchange membrane requires the use of noble metal electrocatalyst, which increases the lifecycle costs and also limits the choice of fuel in the PEMFC to hydrogen, formic acid or methanol.

Alkaline fuel cells (AFCs) were used in NASA space flights throughout 1970s and are still being used in the space shuttle. However, in recent years since the introduction and advancement of PEMFCs, very little attention has been paid to AFC development despite the numerous advantages of alkaline fuel cell system. It is well known that electrochemical oxidation of fuel and electrochemical reductions of oxygen are kinetically more favorable in an alkaline media even at low temperature (T<100° C.), so alkaline electrolyte offers the best prospects for using non-noble metal as the catalyst. At the system level, cathode flooding is less problematical in an AFC since water is produced on the anode side, and methanol, ethanol or borohydride can be used as the fuel; the cross-over issue can also be mitigated with non-precious metal oxygen reduction reaction (ORR) catalysts. In fact, since the pioneering work in alkaline fuel cells by Bacon, in the 1970s and 1980 efforts were made to further develop AFCs for space, electric vehicle (EV) and stationary power applications. The majority of early AFCs used liquid KOH as the electrolyte in either immobilized (in asbestos matrices) or circulated form, due to the very high intrinsic ionic conductivity (>0.6 S cm$^{-1}$) of the KOH electrolyte (>0.6 S cm$^{-1}$). However, there are problems encountered in the use of liquid alkaline electrolyte due to: 1) carbonation of the electrolyte by $CO_2$ either from air or from the fuel oxidation products; 2) electrode degradation due to liquid flooding and carbonate precipitation; and 3) altitude sensitivity for the AFC stack. Furthermore, AFCs based on liquid alkaline electrolyte have much lower volumetric power density as compared to modern PEMFCs.

Recently, anion exchange membrane-based fuel cells (AEMFCs) were re-introduced to address these issues. The adoption of AEMFCs offers advantages over PEMFCs in addition to liquid electrolyte, including fast oxygen reduction kinetics, low cost catalyst materials and less corrosion issues. Great effort has been made in developing advanced anion exchange membranes for AEMFCs. Ideal AEMs should have the following characteristics: 1) high ionic conductivity; 2) good chemical and thermal stability in alkaline environment; 3) excellent oxidation stability; 4) low gas or fuel cross-over; and 5) excellent mechanical strength. With technical advancements, ion conductivity has been successfully increased and chemical stability in alkaline electrolyte has also been greatly improved; however, oxidation stability of the AEM has not gained sufficient attention. It is known that hydrocarbon polymer-based AEMs are subject to oxidative attack by the oxidants produced in the electrochemical or photo electrochemical reaction, leading to fast degradation of the membrane and short operating life. In an AEM-based water electrolyzer, oxygen evolution reaction could pose even more severe challenges to the oxidation stability of the AEMs.

FIG. 1 is a graphical representation summarizing the compositions of the state-of-the-art AEMs, including substrate, polymer backbone, spacer between polymer backbone and cationic group, and cationic functional group, in accordance with various embodiments. The prospect of developing very low cost AEMFCs has driven a recent surge of interest in developing AEMs. AEMs are mainly polymer electrolytes that conduct anions (e.g. OH$^-$) with cationic functional group attached as side chain or in the backbone structure. So far, a large array of backbone polymers, including polyvinylbenzylchloride (PVBC), polyphenylene oxide (PPO), poly(ether ether ketone) (PEEK), polybenzimidazole (PBI), polypropylene (PP), ethylene tetrafluoroethylene (ETFE), poly(olefin), poly(ether sulfone) (PES), styrene-ethylene-butylene-styrene (SEBS), polysulfones, polyetherimides, poly(aryl ethers), vinyl aliphatic/aromatic polymers and a large variety of cationic functional groups, including N, P, S, and metal (Ru, Cp$_2$*Co) based groups, have been synthesized and employed to make the membranes (see FIG. 1).

For example, US Patent application 2014/0107237 taught a family of cation-strung polymer membrane showing high ionic conductivity (up to 67 mS/cm). Masel et al. in U.S. Pat. No. 9,370,773 taught an ion conductive membrane comprising of copolymer of styrene and vinylbenzyl-Rs (where Rs is selected from the group consisting of imidazolium and pyridiniums). Although copolymers were employed to form the membrane backbone, such hydrocarbon polymer backbone has low oxidation resistance toward the species generated in the electrochemical processes.

Rusch and Kolde, in U.S. Pat. No. 6,130,175, taught a thin multi-layer composite membrane, in which two different ion-exchange resins were impregnated on the opposite sides of the porous support. The membrane claims to have substantially higher ionic conductivity than other ion exchange membranes.

Bahar and Saltwick, in U.S. Patent Application 2020/0070142A1, taught a multiple layer ionic polymer membrane structure where each layer contains substantially different chemical compositions, such as ionic functionality. The membrane claims to have different functions, such as reducing fuel crossover and imparting substantial hydrophobicity. However, such multiple layer polymer membranes do not provide better oxidation resistance than single layer polymer membranes since they are all made of polymers.

Long term stability of the proton exchange membrane is also critical in numerous applications, such as fuel cells. Bauer, et al., in U.S. Pat. No. 7,108,935, invented a composite ion exchange membrane made of an ionic polymer uniformly filled with zirconium phosphate particles. The composite proton exchange membrane is claimed to have high performance, with decreased methanol crossover in direct methanol fuel cells. Roelofs in U.S. Pat. No. 8,617,765 taught chemically stabilized ionomers containing inorganic fillers. The ionic polymers showed reduced degradation.

Bahar and Gu, in U.S. Patent Application 2020/0406248A1, taught a similar approach by mixing metal oxides with an anionic polymer, which has showed better water retention in the membrane and reduce the gas crossover. However, no information is given for the oxidation resistance.

With these efforts, promising results have been achieved and membrane performance has been substantially improved (e.g. ionic conductivity over 70 mS/cm at room temperature). However, the durability of AEMs is becoming a more critical issue in AEMFC and electrolysis applications, as ionic conductivity of the membrane decreases due to the activity of $OH^-$ towards positive charged functional groups through E1, E2 reactions or Nucleophilic attack. Additionally, these hydrocarbon-based polymer backbones can also undergo degradation reaction by oxidative species generated in the electrochemical reaction, leading to performance degradation and/or mechanical failure of the membrane.

While a perfluorinated polymer backbone can substantially improve the oxidation stability, perfluorinated polymer exhibits instability in the alkaline electrolyte and is not ideal polymer backbone for the AEMs.

Therefore, current art needs substantial improvement in oxidation resistance to achieve the long durability of the anion exchange membrane for numerous industrial applications, including AEMFCs, AEM electrolyzers and other applications. There exists a strong motivation to develop an out-of-the-box concept to solve these challenging issues of alkaline and oxidation stability.

BRIEF DESCRIPTION OF THE DRAWINGS

FIG. 6A is an SEM image of ZrP made with 15M $H_3PO_4$, in accordance with various embodiments;

FIG. 6B is an SEM image of ZrP with 6M $H_3PO_4$, in accordance with various embodiments;

FIG. 6C is a graphical illustration comparing the results of FIGS. 6A and 6B, in accordance with various embodiments;

SUMMARY OF THE INVENTION

The present invention provides a composite anion exchange membrane (AEM) that exhibits substantially improved oxidation resistance and durability. An exemplary AEM may be a composite ion exchange membrane compromising a layer of the state of the art polymeric AEM, an inorganic nanosheet laminar layer on one or both sides of the polymeric AEM layer, a porous layer of oxidation resistance polymer as the binder as illustrated in FIG. 2, or a combination thereof. One layer of the membrane will be made of high-performance polymeric anion exchange materials. The inorganic nanosheet laminar layer provides strong chemical stability and especially oxidation resistance.

Figure 1:
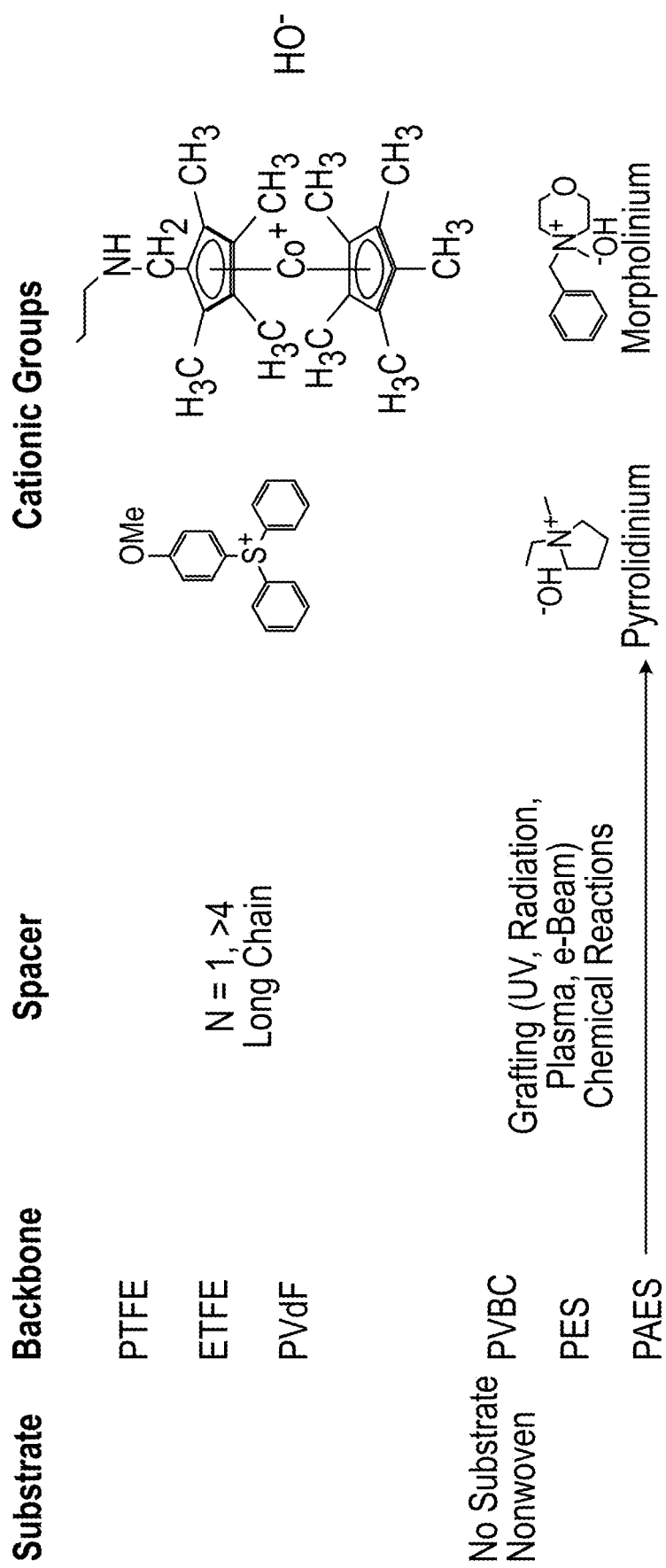
FIG. 1 is a diagram that includes summary of the compositions of the state-of-the-art AEMs, including substrate, polymer backbone, spacer between polymer backbone and cationic group, and cationic functional group, in accordance with various embodiments.
Figure 1:
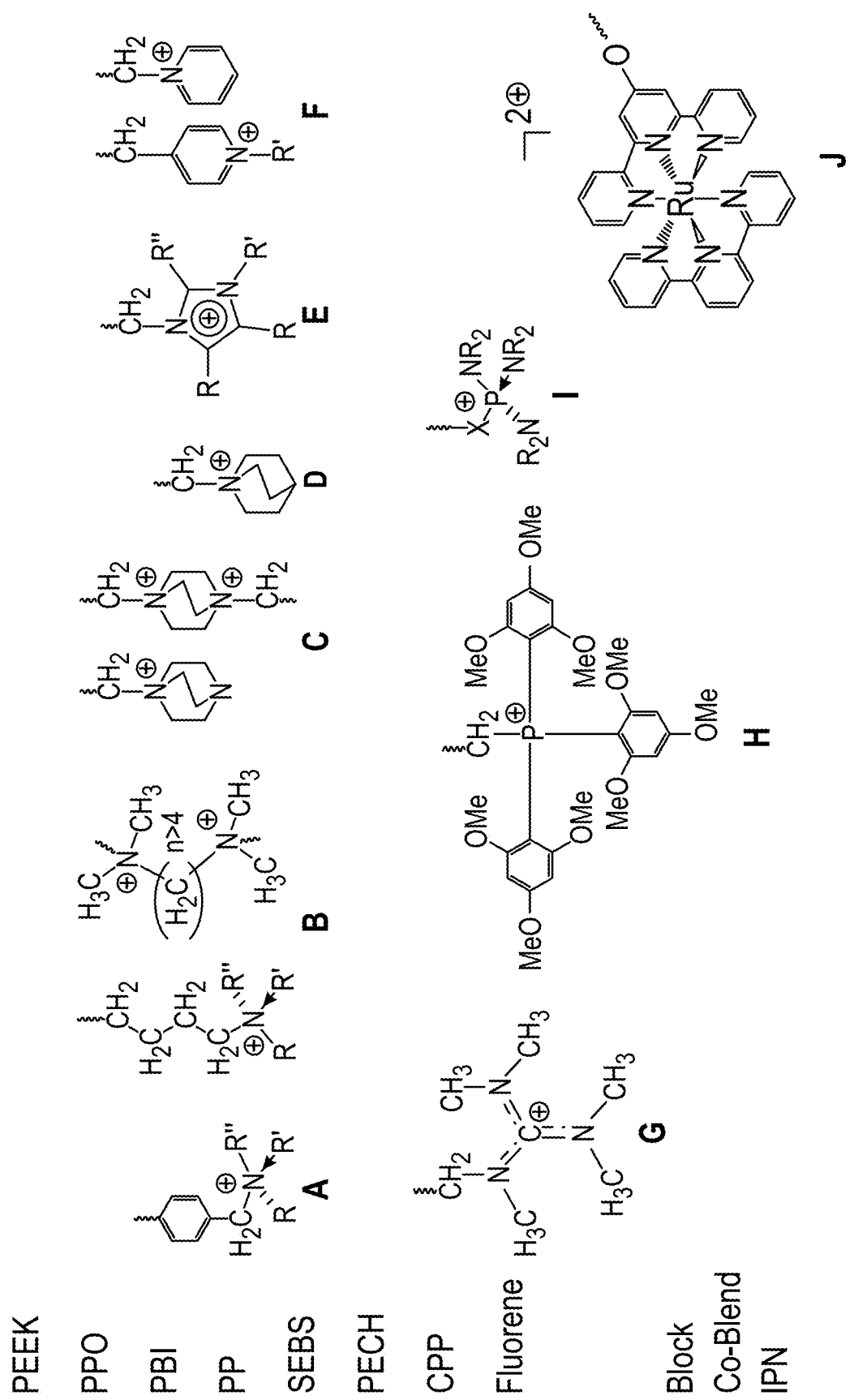
Figure 2A:
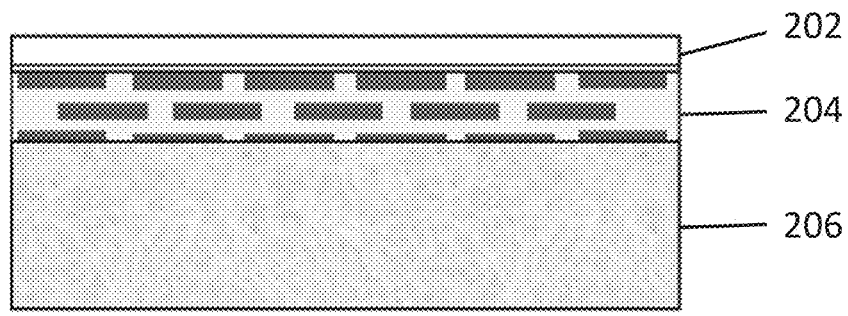
FIGS. 2A and 2B are illustrations of a composite AEM with a) one side coated with nanosheet laminar layer and polymer binder layer; and b) both sides coated with nanosheet laminar layers and polymer binder layers, in accordance with various embodiments.
Figure 2B:
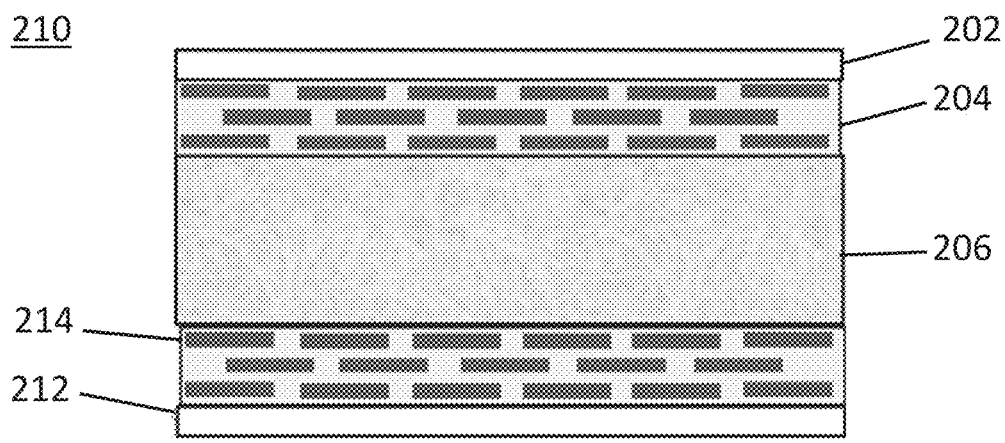

FIGS. 2A and 2B are illustrations of a composite ion exchange membrane, in accordance with various embodiments. In an embodiment, membrane 200 may include a polymer binder layer 202, a nanosheet layer 204, and a polymeric AEM layer 206 (AEM layer 206 may be any polymeric AEM known in the art). Polymer layer 202 may be a porous layer that acts as a binder. In an embodiment, polymer layer 202 is oxidation-resistant. Polymer layer 202 may include Nafion, PVdF, or some other ionic or non-ionic fluoropolymer or other polymer solution.

Nanosheet layer 204 may be made of two-dimensional nanosheets with thickness ranging from 0.3 nm to 200 nm. For these nanosheet materials, the aspect ratio may be expressed as the ratio of the platelet length to the platelet thickness. Nanosheets used for making nanosheet layer 204 may have an aspect ratio from five-to-one to one hundred thousand-to-one. While not limited by the examples, Table 1 provides an exemplary classification of inorganic layered materials that may form nanosheets through, for example, exfoliation. Nanosheets with aspect ratios over 5 may be beneficial for use in the present invention. Recently, nanosheets have been attracting great attention for their use in making ultrathin gas or ion sieving. They have not been employed as the protection layer for anion exchange membranes.

In another embodiment, in addition to polymer layer 202, nanosheet layer 204, and AEM layer 206, membrane 210 may further include an additional polymer layer 212 and nanosheet layer 214, which may be identical or similar to polymer layer 212 and nanosheet layer 204, respectively.

TABLE 1

Classification of Inorganic Layered Materials for Nanosheet Exfoliation

| Group | Subgroup | Examples |
|---|---|---|
| Ion Exchangeable | Cation exchangeable | Clay(montmorillonite,hectorite, vermiculite)<br>Metal phosphates<br>Niobates ($K_4Nb_6O_{17}$)and titanates<br>Manganates<br>Zeolites (ZSM-5) |
|  | Anion exchangeable | Layered double hydroxide (LDH: $Mg_{1/3} Al_{2/3}$ $(OH)_2 (NO_3)_{1/3}$)<br>Hydroxide salt ($La(OH)_2NO_3$) |
| Non-ion-exchangeable | Nonpolar | Graphite (graphene)<br>Metal dichalocogenides ($MoS_2$)<br>Boron nitride (BN) |
|  | Polar | Graphene oxide<br>Metal carbides/nitrides (MXene:$Ti_2C$)<br>Metal phosphate ($VOPO_4 \cdot 2H_2O$) |

In one embodiment, non-ion exchangeable nanosheets, including but not limited to boron nitride, graphene or graphene oxide, MXene, or metal dichalocogenides, may be employed to make an ultrathin laminar layer on one or both sides of the polymeric AEMs of the art.

More preferably, ion exchangeable nanosheets, including cation exchangeable nanosheets and anion exchangeable nanosheets, may be employed to make an ultrathin laminar layer on one or both sides of the polymeric AEMs of the art.

Most preferably, anion exchangeable nanosheets, including but not limited to LDH, hydroxide salts or other cation functionalized nanosheets, may be employed to make the ultrathin laminar layer on one or both sides of the polymeric AEMs of the art.

Figure 3:
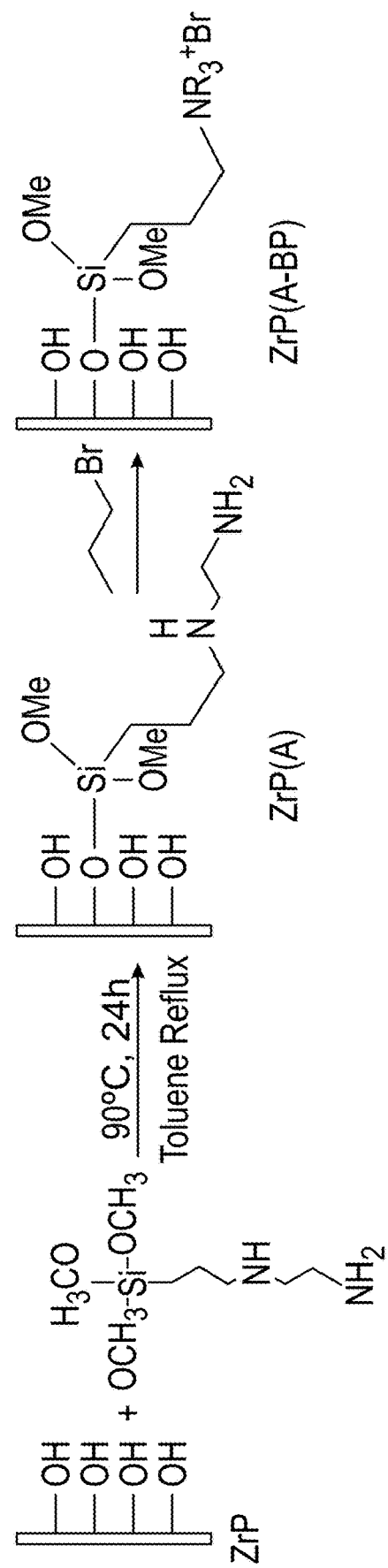
FIG. 3 depicts a ZrP Nanosheet Surface Functionalization, in accordance with various embodiments.

FIG. 3 depicts a ZrP Nanosheet Surface Functionalization, in accordance with various embodiments. In one embodiment, a layer structured tetravalent metal acid salts (TMA) (M(IV) $(HXO_4)_2 \cdot nH_2O$ where M(IV)=Zr, Ti, Ce, Sn, etc and X=P, Mo, W etc.) may be exfoliated to form colloid dispersion of nanosheets. These materials may be highly insoluble and possess excellent thermal, alkaline and chemical stability. In one specific embodiment, metal phosphonates with layered structures of both α-type ($M(O_3P$—$R)_2 \cdot nH_2O$) or γ-type ($MPO_4 (O_2P(OH)R) \cdot nH_2O$) can be regarded as inorganic-organic polymers in which organic moieties (R) may be connected to a giant planar inorganic macromolecule (nanosheet) through strong chemical bond. By choosing different R functional groups, interlayer distance, ranging from 0.76 nm for pristine α-$Zr(O_3POH)_2$ (i.e. α-ZrP) to 6.6 nm for intercalated α-ZrP with large biomolecules, and proton mobility can be fine-tuned and engineered.

In another embodiment, zircornium hydrophosphate (α-ZrP) and its derivatives may be functionalized to make a variety of materials including proton conductors; however, no one has attempted to make the cation functionalized ZrP. In this embodiment, ZrP nanosheet may be functionalized with silane condensation reaction followed by ammonium ion functionalization (e.g., as shown in FIG. 3). The functionalized nanosheets are anion exchangeable and can be employed to make the laminar layer of one or both sides of polymeric AEMs.

Figure 4A:
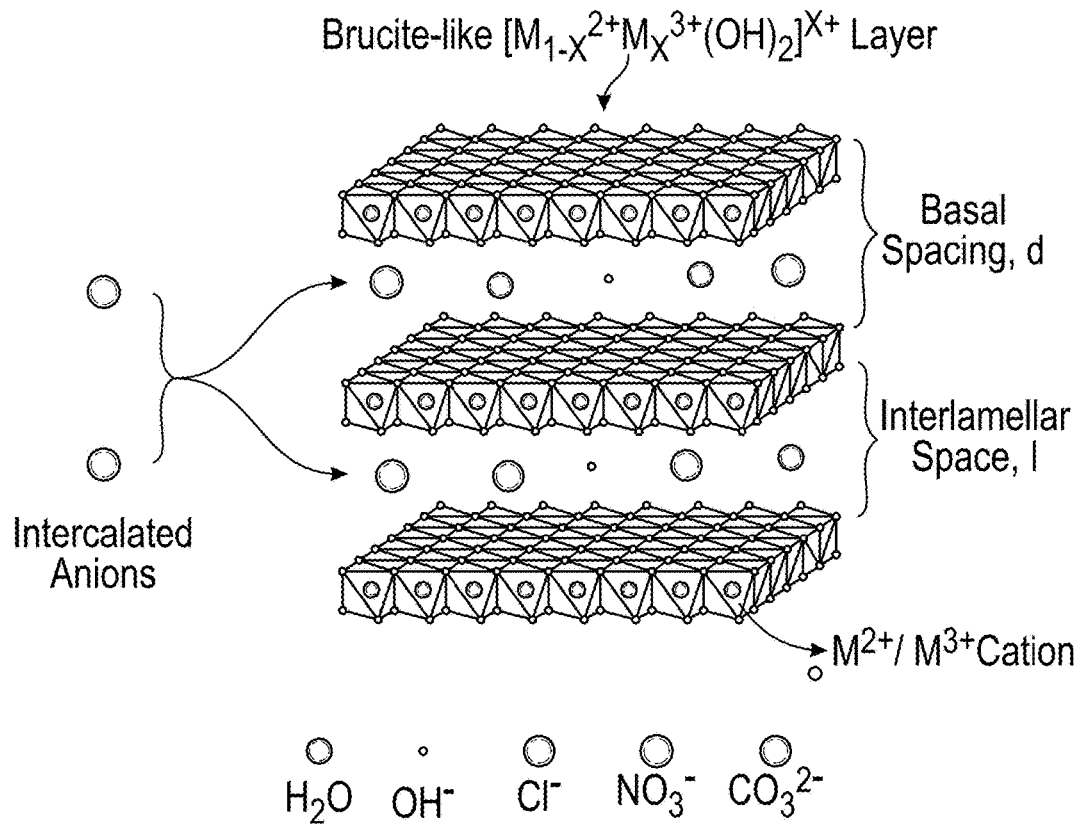
FIG. 4A depicts an LDH material structure, in accordance with various embodiments.

In an embodiment, anion exchangeable nanosheets, including but not limited to LDH nanosheets may be employed to make the laminar layer on one or both sides of AEMs. The general formula of LDHs can be expressed as $[M^{2+}_{1-x}M^{3+}_x(OH)_2]^{x+}[A^{n-}_{x/n}]^{x-} \cdot mH_2O$. LDHs are anion exchangeable lamellar inorganic materials, whose structure is based on brucite-like layers containing a divalent $M^{2+}$ cation coordinated by six hydroxyl group. Replacing the divalent $M^{2+}$ (e.g., $Mg^{2+}$, $Zn^{2+}$, $Ca^{2+}$, $Ni^{2+}$) with trivalent $M^{3+}$ ions (e.g., $Al^{3+}$) gives rise to the positive charge on the layered structure (FIG. 4A). By adjusting the divalent and trivalent metal ratio, the surface charge of the layers may be varied, which may be counter-balanced by the interlayer anion $A^{n-}$, which could be $Cl^-$, $NO_3^-$, $CO_3^{2-}$ or $OH^-$. As compared with other cation exchangeable lamellar materials, such as α-ZrP, LDHs have intrinsic anion conductivity—rendering better ionic conductivity for the composite AEMs.

Figure 4B:
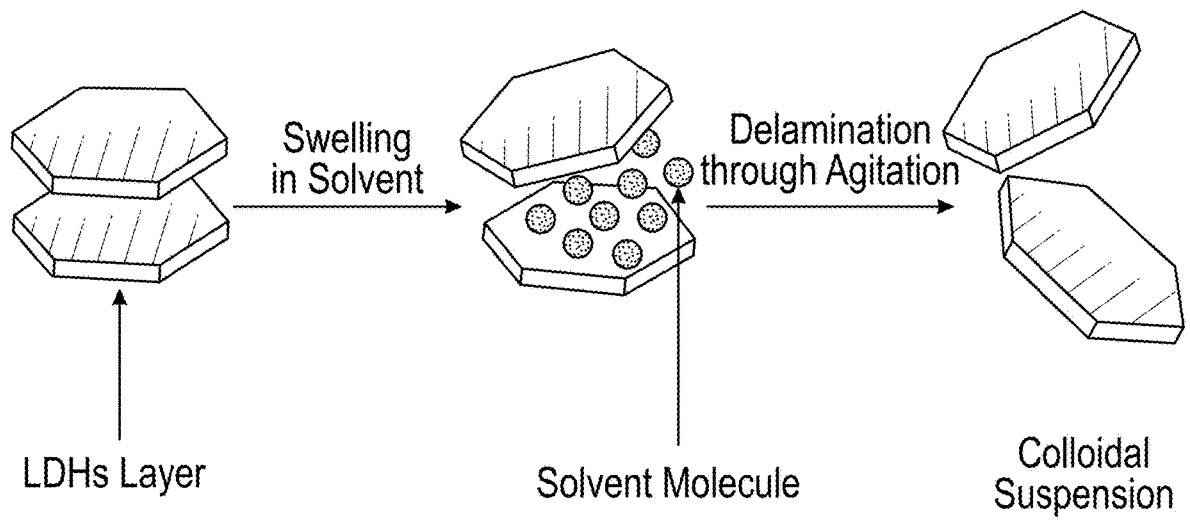
FIG. 4B is a graphical illustration of a process for forming a nanosheet, in accordance with various embodiments.

Moreover, LDHs can be readily exfoliated, forming a colloid dispersion of single layer or ultrathin nanosheets in various media solutions with or without sonication (FIG. 4B). In an embodiment, single layer or ultrathin nanosheets may be employed as building blocks for a wide variety of functional nanostructured materials. Although LDHs and their nanosheets have been extensively investigated in numerous applications, no work has been carried out using the LDH anion exchangeable nanosheet to make a composite AEM to enhance its functionality and durability.

FIG. 4A depicts an LDH material structure, while FIG. 4B is a graphical illustration of a process for forming a nanosheet, in accordance with various embodiments. In an embodiment, the colloid dispersion of the pellicular nanosheets can be used to prepare ultrathin (<5 micron) laminar layer on one or both sides of AEM by simple casting technique followed by thin polymer binder coating. After evaporation of solvent, the intermolecular bonding force between nanosheets may lead to self-assembled laminar structure. Due to such self-assembling features, a nanosheet may be a better material than a nanosphere for making high performance membranes. Such an ultrathin layer may function as a "firewall" against strong oxidative attack while allowing anion conduction.

In one embodiment, oxidation resistant polymers, including but not limited to, Nafion, PVdF, or other ionic or non-ionic fluoropolymer solution, may be used to coat such nanosheet laminar layers to enhance the adhesion of the composite AEMs.

EXAMPLES

AEM Performance and Stability Evaluation Methods a) Conductivity

The ionic conductivity of the membranes in either $Cl^-$ or $OH^-$ form was measured using 3-probe AC electrochemical impedance spectroscopy at a fixed temperature with a Gamry Instrument. Due to its air stability, most of the ionic conductivities were measured in the $Cl^-$ form of AEMs.

b) Alkaline Stability

Alkaline stability was carried out by immersing the membranes (1 cm×3 cm) in a 1M KOH solution at 80° C. in a seal container for certain period time. The membrane samples were taken from the KOH solution, neutralized with 0.1 M HCl solution and rinsed with deionized water several times. Although the membrane test is in $OH^-$ form, it was exchanged to $Cl^-$ for impedance measurement for more reliable results (since membrane in its OH⁻ form can react with $CO_2$ in the air leading to the change of ionic conductivity while measuring).

c) Oxidative Stability

Oxidative stability was measured according to literature. Specifically, the membrane samples (1 cm×3 cm) were immersed in Fenton's reagent (4 ppm of iron(II) sulfate heptahydrate in 3% $H_2O_2$) at 80° C. for 24 hr. The oxidative stability was evaluated by comparing the weight losses of the dried membrane samples.

Example 1

Preparation of Pore-Filled Polymeric Anion Exchange Membrane

A monomer solution was prepared using 94.4 wt % vinylbenzyl chloride (VBC), 5.6 wt % divinylbenzene (DVB) and 1.76 wt % thermal initiator. The ratio of monomer and crosslinker can be varied to make different precursor polymer film. A porous polypropylene (PP) substrate was impregnated with prepared monomer solution for 1 hour at room temperature. After the monomer sorption process, polymerization proceeds at 90° C. for 3 hours, leading to the formation of membrane precursor film.

The quaternized films were prepared by the immersion of the precursor film in a 30 wt % solution of the corresponding heterocyclic amine, e.g., N-methylpiperidine (MP) as the benchmark AEM at 60° C. for 24 h. The quaternized films were washed with distilled water a number of times. The resulting membrane is an anion exchange membrane in Cl⁻ form. This polymeric membrane is used for comparison purpose. Other polymeric AEMs procured from commercial sources (hereby denoted Commercial F AEM and Commercial X AEM) were also used for comparison purposes.

Example 2

Pristine α-ZrP Powder Synthesis and Nanosheet Preparation

Figure 5:
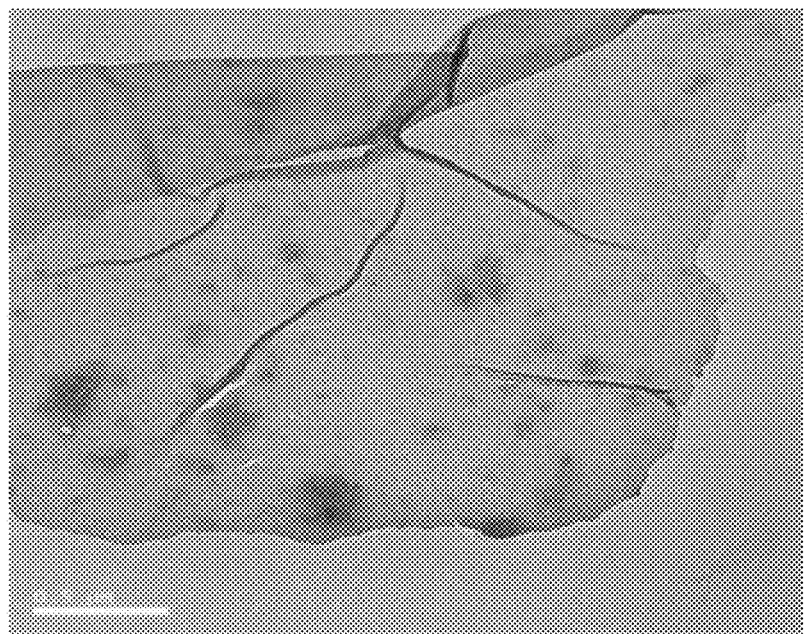
FIG. 5 is a TEM image of a ZrP Nanosheet, in accordance with various embodiments.

FIG. 5 is a TEM image of a ZrP Nanosheet, in accordance with various embodiments. FIG. 6A is an SEM image of ZrP made with 15M $H_3PO_4$. FIG. 6B is an SEM image of ZrP with 6M $H_3PO_4$, in accordance with various embodiments. FIG. 6C is a graphical illustration comparing the results of FIGS. 6A and 6C, in accordance with various embodiments.

In an exemplary embodiment, α-ZrP powders were synthesized following procedure by Clearfield et al. A sample of 10 g of $ZrOCl_2·8H_2O$ (Alfa Aesar) was mixed with 100 mL of 12M $H_3PO_4$ (Sigma Aldrich) in a sealed Teflon-lined pressure vessel, and the mixture was reacted at 200° C. for 48 h. α-ZrP microcrystals were then dispersed in deionized water (i.e., 0.1 g in 6.7 ml water) followed by exfoliation by adding TBAOH (Sigma Aldrich) in ice bath for 1~2 hours. The solution was taken out from ice bath and treated with ultra-sonication. The solution was then centrifuged at a speed of 6000 rpm and 10000 rpm for 15 and 20 minutes respectively. Upper solution was collected as exfoliated nanosheets. TEM image of a typical nanosheet shown in FIG. 5 indicates that the nanosheet has a lateral dimension around 2~4 μm.

By changing the concentration of $H_3PO_4$ (from 15M to 6M), nanosheets with different aspect ratios may be obtained and used for making nanosheet membrane. SEM and XRD analysis were also conducted on both ZrPs (shown in FIGS. 6A-6C). 6M acid may lead to ZrP with lower aspect ratio (FIG. 6B), while 15M acid may lead to ZrP with higher aspect ratio (FIG. 6A). Combination of high aspect ratio ZrP and low aspect ratio ZrP may result in a better laminar layer. The prepared ZrP microcrystals (e.g., 0.1 g in 6.7 ml water) were exfoliated by 3.3 ml 0.1M TBAOH (tetra-n-butylammonium hydroxide) in an ice bath. The dispersion of ZrP was treated with 3.3 ml of 0.1M HCl to regenerate the protonated ZrP nanosheets. The nanosheets were collected by centrifuge and washed with distilled water several times. Pristine ZrP nanosheet dispersion may be used to make the laminar layer on one or both sides of the AEMs.

The dispersion may also be washed with acetone three times to remove water, followed by toluene wash for three times. This process may lead to the dispersion of ZrP nanosheets in toluene for further synthesis of modified ZrP nanosheets.

Example 3

Cation Functionalized α-ZrP Nanosheet Preparation

As illustrated in the schemes below, three approaches were employed in this embodiment to make the functionalized α-ZrP nanosheets.

Scheme I: ZrP(Cl)

Figure 7:
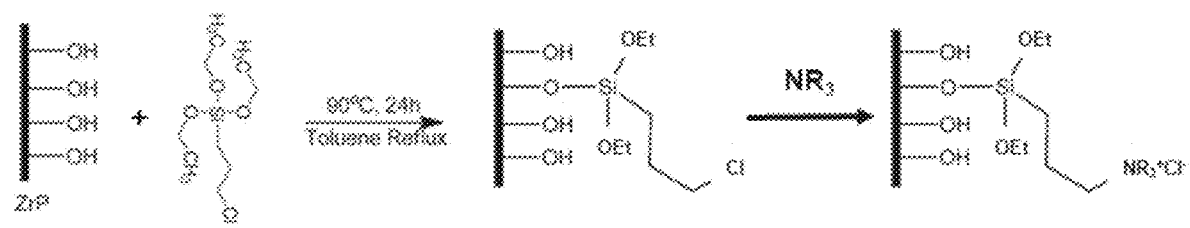
FIG. 7 is a representation of a process for forming a nanosheet, in accordance with various embodiments.

FIG. 7 is a representation of a process for forming a nanosheet, in accordance with various embodiments. ZrP dispersion in toluene (50 ml toluene, 0.1 g ZrP) were mixed with 2.5 ml of (3-chloropropyl)triethoxysilane (CPTES). The dispersion was refluxed for 24 hrs. The obtained solid was washed with toluene 3 times and dried for the next step. The product was abbreviated as ZrP(Cl).

Scheme II: ZrP(A)

Figure 8:
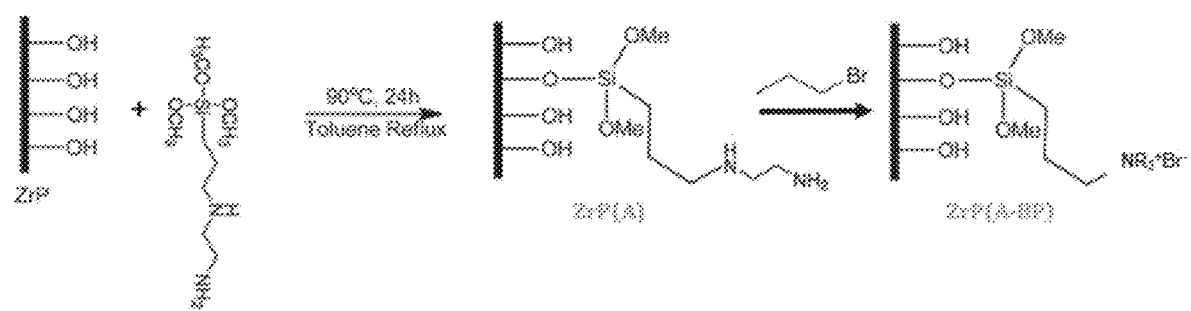
FIG. 8 is a representation of a process for forming a nanosheet, in accordance with various embodiments.

FIG. 8 is a representation of a process for forming a nanosheet, in accordance with various embodiments. 0.1 g of the ZrP was dispersed in 50 ml toluene. After the addition of 2.5 ml of N-[3-(Trimethoxysilyl)propyl]ethylenediamine, the mixture was refluxed for 24 hrs. The obtained solid was washed with toluene 3 times and dried. Quaternization was carried out with 30 wt % 1-Bromopropane in IPA at 60° C. for 24 hr.

Scheme III: ZrP(I)

Figure 9:
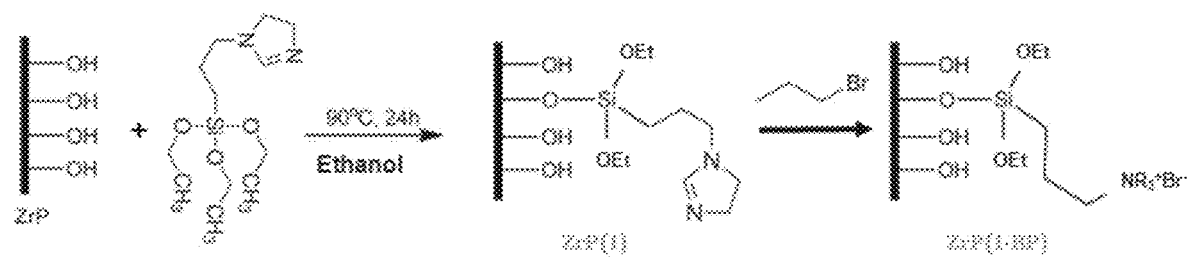
FIG. 9 is a representation of a process for forming a nanosheet, in accordance with various embodiments.

FIG. 9 is a representation of a process for forming a nanosheet, in accordance with various embodiments. ZrP dispersion in ethanol (50 ml ethanol, 0.1 g ZrP) was mixed with 1 ml of Triethoxy-3-(2-imidazolin-1-yl)propylsilane. The dispersion was refluxed for 24 hrs. The obtained solid was washed with ethanol 3 times and dried. Quaternization was carried out with 30 wt % 1-Bromopropane in IPA at 60° C. for 24 hr.

ATR/FT-IT data suggested that two silane compounds (i.e. N-[3-(Trimethoxysilyl)propyl]ethylenediamine and Triethoxy-3-(2-imidazolin-1-yl)propylsilane) can functionalize the ZrP nanosheet (denoted ZrP(A) and ZrP(I)) through condensation reaction. Such functionalized ZrP nanosheets may be used to coat on one or both sides of AEMs.

Example 4

LDH Nanosheet Preparation $Mg_3Al$-LDH nanosheets with composition of $Mg_3Al(OH)_2$—$CO_3$ were synthesized through a two-step procedure, slightly modified from Cermelj's method Step 1. Homogeneous Precipitation of the $Mg_3Al$-LDHs 150 mmol of $MgCl_2$ $6H_2O$, 50 mmol of $AlCl_3$ $6H_2O$ and 1000 mmol of urea were dissolved in 800 mL distilled water to form Solution A. 48 mmol of stearic acid was dissolved in 200 mL distilled water at 80° C. and the pH was adjusted to 10 by dropwise addition of 4 M NaOH to form Solution B. Solution A was added to Solution B dropwise over the period of 1 h with vigorous stirring. The resulting reaction mixture was aged on a hot plate heated at 95° C. for 18 h with stirring. After aging, the $Mg_3Al$-LDH products were washed three times with a mixture of ethanol and DI water (1:1 by weight) at 80° C., followed by drying overnight in an oven at 60° C.

Step 2. Solvothermal Treatments of $Mg_3Al$-LDHs 20 grams of the dried $Mg_3Al$-LDH powders prepared by the above homogeneous precipitation was dispersed in 50 mL of ethanol via mixing at 2400 rmp for 5 minutes. The dispersion was then transferred into a 100 mL Teflon liner within a stainless steel outer vessel. The solvothermal treatment was carried out at 150° C. for 48 h. After cooling to the room temperature, $Mg_3Al$-LDH product was washed with 200 mL of ethanol, followed by drying overnight in an oven at 60° C.

LDH nanosheet dispersion with other composition may also be prepared with similar processes. Dispersion of $Mg_3Al$-LDH nanosheets can be done but not limited to the following procedure. 1) 50 mg of the above dried $Mg_3Al$-LDH nanosheets was added to 10 mL of N-Methyl-2-pyrrolidone (NMP) in a glass vial and sonicated for 5 minutes. The dispersion shows translucent and is stable for at least 6 hours. 2) 50 mg of the above dried $Mg_3Al$-LDH nanosheets was added to 10 mL of 1-propanol in a glass vial and sonicated for 5 minutes. The dispersion shows milky and is stable for at least 2 hours. 3) 50 mg of the above dried $Mg_3Al$-LDH nanosheets was added to 10 mL mixture of N-Methyl-2-pyrrolidone (NMP) and ethanol (1:9 by weight) in a glass vial and sonicated for 5 minutes. The dispersion shows translucent and is stable for at least 3 hours.

Example 5

Laminar Nanosheet Layer Coating

Theoretically, ZrP nanosheet could be coated on the precursor film followed by quaternization or on the AEM after quaternization. Preliminary tests suggest that the precursor film is hydrophobic and does not work well with 0.5% ZrP nanosheet dispersion in water. Most of our coating will be carried out on AEM directly after quaternization. In our coating process, dilute ZrP solution was casted on one side of the AEM in a fixture followed by slow drying in a vacuum oven at 65° C. for 24 hrs. Other processes such as spray coating may also be used to obtain laminar nanosheet coating layer. Unlike particular particles, nanosheets may stack on the substrate forming multi-layered laminar structure.

Polymer Binder Coating with Ultrasonic Spray Coating Method

Figure 10:
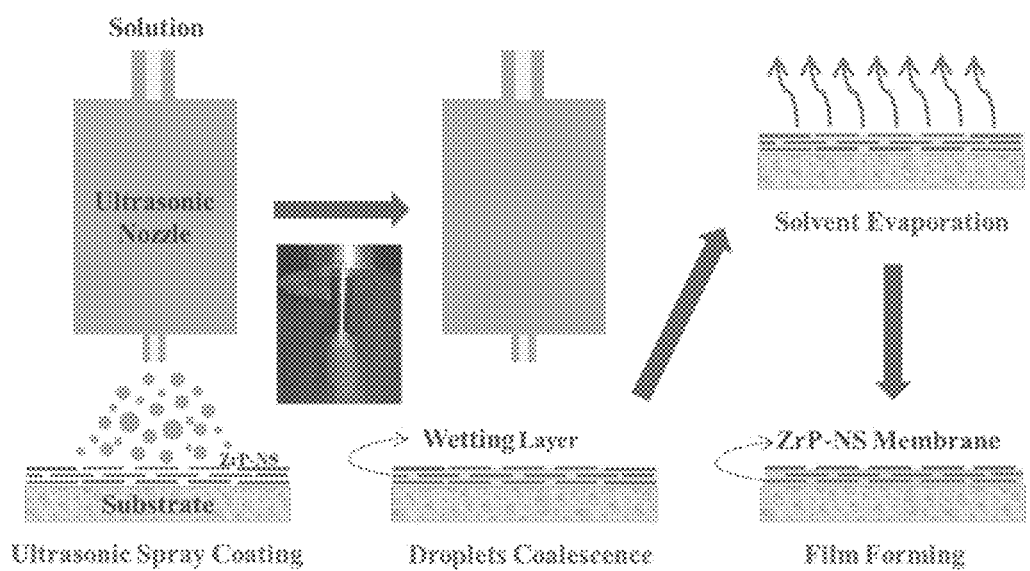
FIG. 10 is a flow diagram of the ultrasonic spray coating processes, in accordance with various embodiments.

FIG. 10 is a flow diagram of the ultrasonic spray coating processes, in accordance with various embodiments. The solution composition for ultrasonic spray coating (USC) was used to spray coating the nanosheet layer. In one embodiment, the solution was composed of 5.69 wt % of Nafion D 2020 (solid Nafion percentage is 1.13%), 15.25 wt % of ethanol, 13.62 wt % of methanol, and 65.43 wt % of DMF. The ultrasonic spray instrument was connected to a syringe pump for precision solution delivery control. The Nafion solution injection speed was 0.5 mL/min, and the ultrasonic spray instrument was operated at 50 kHz (FIG. 7). Various passes can be performed in views of a uniform surface wetting layer formation. The fabricated USC-ZrP nanosheet coated AEM were dried in a vacuum oven at 80° C. for a few hours. In this experiment, the ultrasonic atomizing nozzle was vibrating at high frequency ultrasound (50 kHz) to produce a fine mist at the nozzle tip and form a thin film of micron-sized droplets. From SEM/EDX data, the polymer binder coating thickness is less than 2 μm and is a porous layer. In another embodiment, 0.5% PVdF solution can be used as the coating solution. In another embodiment, 0.5% polyimide solution can be used as the coating solution.

Example 6

TABLE 2

Polymeric AEM Oxidation Stability Comparison

| | Commercial F AEM | Commercial X AEM | Exemplary Polymeric AEM |
|---|---|---|---|
| Weight Loss, % | 35%~40% | >70% | ~20% |

Commercial F AEM and Commercial X AEM were procured. Their oxidation resistances of these AEMs along with our benchmark polymeric AEM (before coating) were measured using the procedure as shown in oxidation stability test section. As shown in Table 2, commercial F AEM lost 35%~40% of its weight due to Fenton reagent oxidation and commercial X AEM lost over 70% of its weight due to Fenton reagent oxidation, while uncoated benchmark polymeric AEM lost 20% of its weight due to Fenton reagent oxidation. All polymeric AEMs exhibited substantial oxidation weight loss, which corresponds to short durability in applications such as AEMFCs and AEM electrolyzers.

Example 7

7.1. Pristine ZrP Nanosheet Coated Polymer AEMs

After the coating process was successfully developed. AEM samples were coated with Pristine ZrP nanosheet layer followed by Nafion coating with ultrasonic spray nozzle. Each coating layer thickness can be well controlled by the number of coatings.

Figure 11:
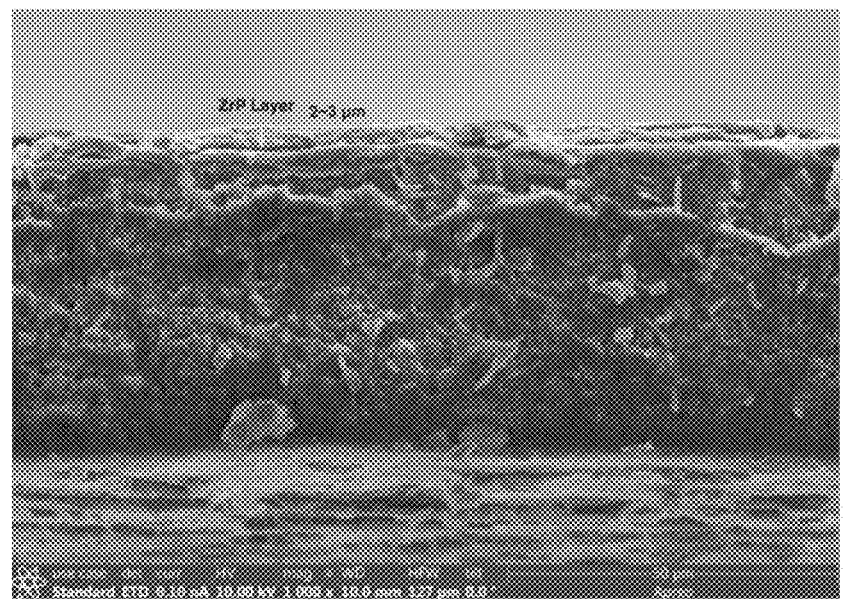
FIG. 11 are graphical representations the cross-sectional image of coated AEM, in accordance with various embodiments.
Figure 12:
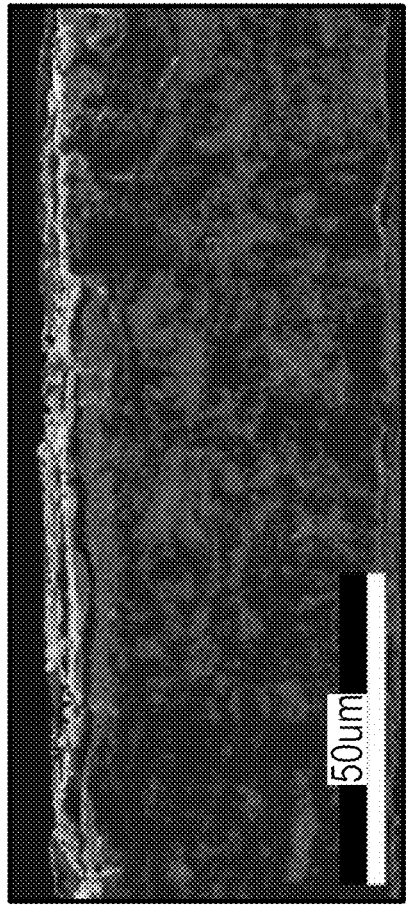
FIG. 12 is a graphical illustration of analysis of SEM cross-sectional image and EDS mapping results, in accordance with various embodiments.
Figure 12:
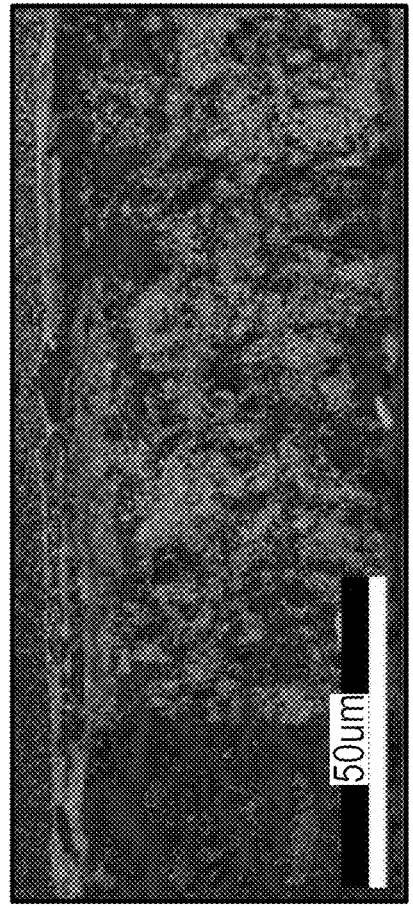
Figure 12:
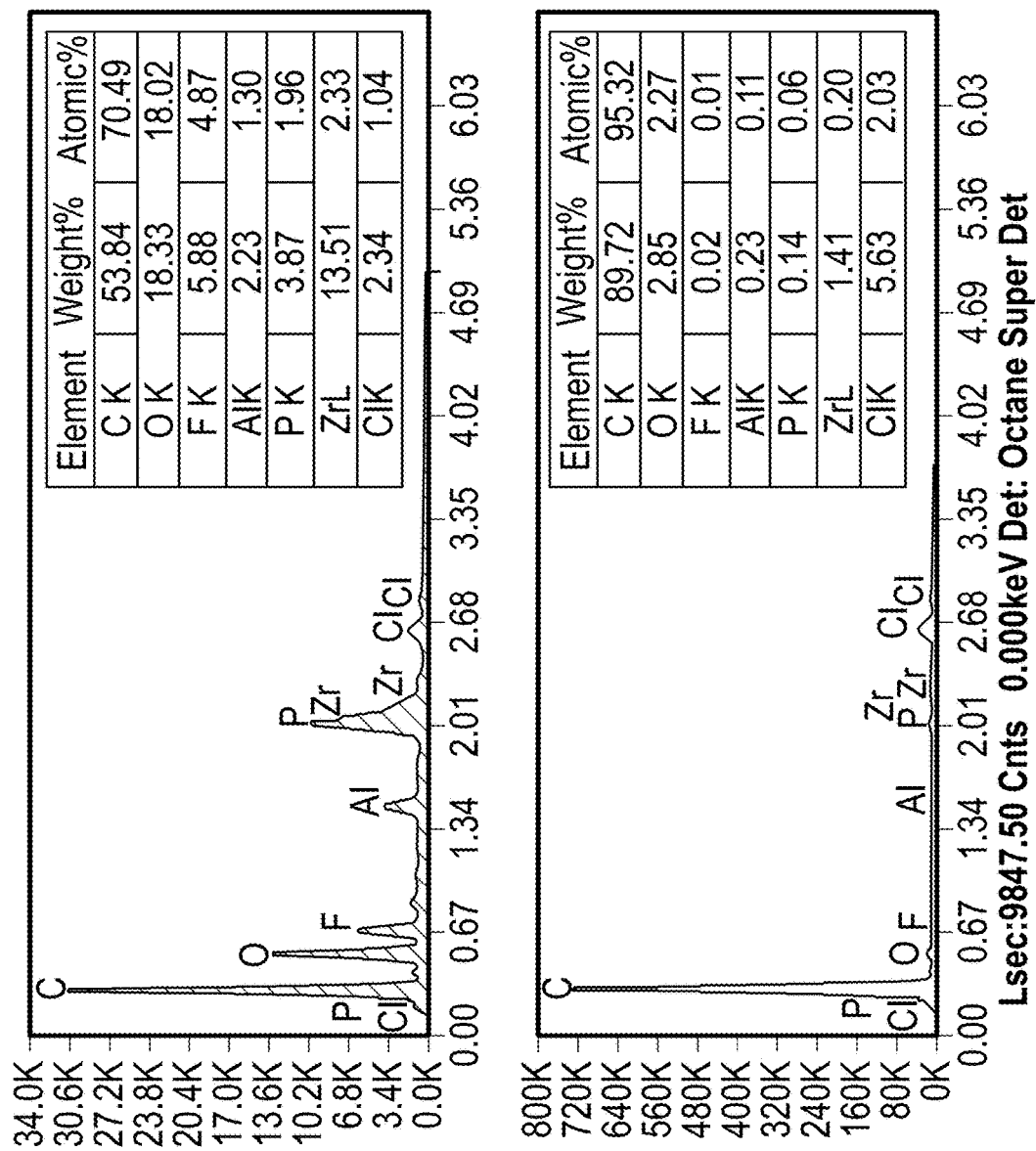
Figure 13:
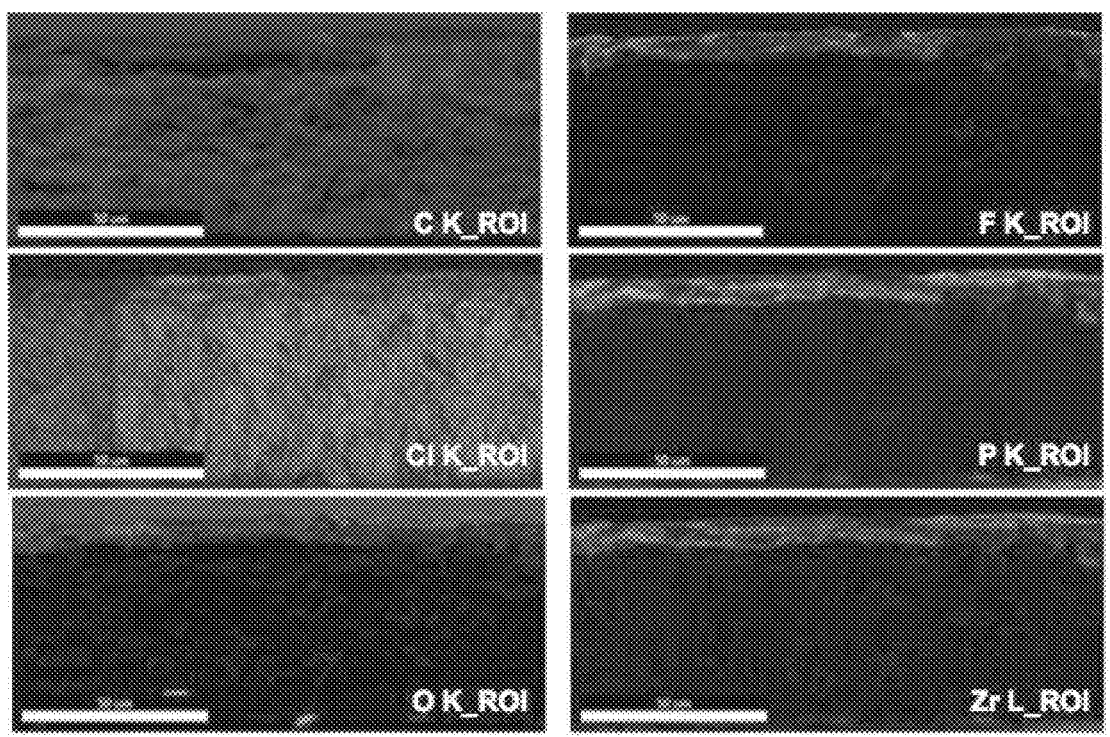
FIG. 13 depicts SEM cross-sectional images of ZrP-AEM, in accordance with various embodiments.

FIG. 11 shows the cross-sectional image of coated AEM, in accordance with various embodiments. The top layer may be made of thin laminar ZrP nanosheet membrane layer (about 2.5 μm) and the Nafion layer may not be visible in FIG. 11 due to ultrathin layer formation. EDS elements mapping of the cross-sectional image may show that ZrP laminar layers (Zr, P, O elements) are coated on the top layer of AEM and Nafion solution (F elements) and was well distributed into ZrP interlayers layers (as shown in FIG. 9 9). FIG. 12 is a graphical illustration of analysis of SEM cross-sectional image and EDS mapping results, in accordance with various embodiments. FIG. 13 depicts SEM cross-sectional images of ZrP-AEM. The results shown in FIGS. 12 and 13 illustrate that thin laminar ZrP and Nafion layers may be successfully coated on AEM.

As discussed in Section 7.3 below, such ZrP-AEM exhibited excellent oxidation resistance.

7.2. Modified ZrP Coated AEM

Similarly, functionalized ZrP nanosheets were coated on the polymer AEM, which also demonstrated superior oxidation resistance as shown on Table 3.

7.3. Oxidation Resistance Comparison

The oxidative stability of both polymer AEM and composite AEM was evaluated under an accelerated degradation test using a Fenton's solution at 80° C. During oxidation test, hydroxyl radicals attack side chains and functional groups first, which could lead to degradation of the functional groups. Some researchers suggested that it is possible that polymer backbone could be subject to oxidative degradation as well.

When compared with the pristine ZrP nanosheet (NS) coated AEM, the functionalized ZrP coated AEM showed the better oxidation stability. The functionalized ZrP coated AEM (one side or both sides) exhibited much higher oxidation stability (6% and 2% weight loss). As compared with a benchmark polymeric AEM, coated AEM exhibits far superior oxidation resistance (2% weight loss vs. 20% weight loss).

TABLE 3

ZrP Nanosheet Coated AEM Oxidation Stability Comparison

| | Exemplary Polymeric AEM | Pristine ZrP NS Coated AEM (one side) | Pristine ZrP NS Coated AEM (both sides) | Functionalized ZrP NS coated AEM (one side) | Functionalized ZrP NS coated AEM (both sides) |
|---|---|---|---|---|---|
| Weight Loss, % | 20% | 8% | ~2% | 6% | <2% |

Example 8

Dispersion of $Mg_3Al$-LDH nanosheets prepared in example 3 was employed for coating AEM on single side and both sides followed by polymer binder coating. The resulting composite AEM exhibited much improved oxidation resistance as shown in Table 4 in the Fenton reagent oxidation weight loss test. The results confirmed our invention that the inorganic nanosheet layer does provide strong oxidation resistance, and can provide long durability in various applications, such as AEMFCs, AEM electrolyzer and other photoelectrochemical apparatus.

TABLE 4

LDH Nanosheet Coated AEM Oxidation Stability Comparison

| | Exemplary Polymeric AEM | LDH NS Coated AEM (one side) | LDH NS Coated AEM (both sides) |
|---|---|---|---|
| Weight Loss, % | 20% | 5% | ~3% |

Persons skilled in the art will also appreciate that the present invention is not limited to only the embodiments described. Persons skilled in the art will also appreciate that the membranes and apparatuses of the present invention may be implemented in other ways than those described herein. Such modifications are within the scope of the present invention.

What is claimed is:

1. A composite ion exchange membrane, comprising:
   a porous first layer comprising a binder, said binder comprising a polymer;
   a second layer comprising a first nanosheet, the second layer being coupled to the first layer, wherein the first nanosheet is an ion-exchangeable two-dimensional nanostructure having an aspect ratio of at least five; and
   a third layer comprising a polymeric ion exchange membrane, the third layer being coupled to the second layer.

2. The composite ion exchange membrane of claim 1, wherein the first nanosheet of the second layer comprises at least one of a clay, a metal phosphate, a niobate, a titanate, a manganate, and a zeolite.

3. The composite ion exchange membrane of claim 1, wherein the first nanosheet of the second layer comprises at least one of a layered double hydroxide and a hydroxide salt.

4. The composite ion exchange membrane of claim 1, wherein the first nanosheet of the second layer comprises at least one of a metal dichalocogenide and boron nitride.

5. The composite ion exchange membrane of claim 1, wherein the first nanosheet of the second layer is a functionalized nanosheet.

6. The composite ion exchange membrane of claim 1, wherein the first nanosheet of the second layer further comprises a laminar structure.

7. An electrochemical apparatus, comprising:
   a composite ion exchange membrane, comprising:
      a porous first layer comprising a binder, said binder comprising a polymer;
      a second layer comprising a first nanosheet, the second layer being coupled to the first layer, wherein the first nanosheet
         comprises an ion-exchangeable two-dimensional structure having an aspect ratio of at least five; and
      a third layer comprising a polymeric ion exchange membrane, the third layer being coupled to the second layer.

8. A fuel cell, comprising:
   a composite ion exchange membrane, comprising:
      a porous first layer comprising a binder, said binder comprising a polymer;
      a second layer comprising a first nanosheet, the second layer being coupled to the first layer, wherein the first nanosheet
         comprises an ion-exchangeable two-dimensional structure having an aspect ratio of at least five; and
      a third layer comprising a polymeric ion exchange membrane, the third layer being coupled to the second layer.

9. An electrolyzer, comprising:
   a composite ion exchange membrane, comprising:
      a porous first layer comprising a binder, said binder comprising a polymer;
      a second layer comprising a first nanosheet, the second layer being coupled to the first layer, wherein the first nanosheet
         comprises an ion-exchangeable two-dimensional structure having an aspect ratio of at least five; and
      a third layer comprising a polymeric ion exchange membrane, the third layer being coupled to the second layer.

10. A composite ion exchange membrane, comprising:
    a porous first layer comprising a binder, said binder comprising a polymer;
    a second layer comprising a first nanosheet, the second layer being coupled to the first layer, wherein the first nanosheet is a non-ion-exchangeable nanosheet having a two-dimensional nanostructure with an aspect ratio of at least five; and a third layer comprising a polymeric ion exchange membrane, the third layer being coupled to the second layer.

11. The composite ion exchange membrane of claim 10, wherein the first nanosheet of the second layer is nonpolar.

12. The composite ion exchange membrane of claim 10, wherein the first nanosheet of the second layer comprises at least one of a metal dichalocogenide and boron nitride.

13. The composite ion exchange membrane of claim 10, wherein the first nanosheet of the second layer is polar.

14. The composite ion exchange membrane of claim 10, wherein the first nanosheet of the second layer comprises at least one of a metal carbide, a metal nitride, and a metal phosphate.

15. The composite ion exchange membrane of claim 10, wherein the first nanosheet of the second layer further comprises a laminar structure.

16. A composite ion exchange membrane, comprising:
    a porous first layer comprising a binder, said binder comprising a polymer;
    a second layer comprising a first nanosheet, the second layer being coupled to the first layer, wherein the first nanosheet is a functionalized nanosheet having a two-dimensional nanostructure with an aspect ratio of at least five; and
    a third layer comprising a polymeric ion exchange membrane, the third layer being coupled to the second layer.

17. The composite ion exchange membrane of claim 16, wherein the first nanosheet of the second layer comprises at least one of a functionalized clay, a functionalized metal phosphate, a functionalized niobate, a functionalized titanate, a functionalized manganate, and a functionalized zeolite.

18. The composite ion exchange membrane of claim 16, wherein the first nanosheet of the second layer comprises at least one of a functionalized layered double hydroxide and a functionalized hydroxide salt.

19. The composite ion exchange membrane of claim 16, wherein the first nanosheet of the second layer is a functionalized nonpolar nanosheet.

20. The composite ion exchange membrane of claim 16, wherein the first nanosheet of the second layer comprises at least one of a functionalized metal dichalcogenide and a functionalized boron nitride.

21. The composite ion exchange membrane of claim 16, wherein the first nanosheet of the second layer is a functionalized polar nanosheet.

22. The composite ion exchange membrane of claim 16, wherein the first nanosheet of the second layer comprises at least one of a functionalized metal carbide, a functionalized metal nitride, and a functionalized metal phosphate.

23. The composite ion exchange membrane of claim 16, wherein the first nanosheet of the second layer further comprises a laminar structure.

* * * * *